(12) United States Patent
Honda et al.

(10) Patent No.: US 12,261,267 B2
(45) Date of Patent: Mar. 25, 2025

(54) BATTERY

(71) Applicant: Panasonic Intellectual Property Management Co., Ltd., Osaka (JP)

(72) Inventors: Kazuyoshi Honda, Osaka (JP); Akio Kaneyama, Osaka (JP); Kazuhiro Morioka, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 719 days.

(21) Appl. No.: 17/337,496

(22) Filed: Jun. 3, 2021

(65) Prior Publication Data
US 2021/0288348 A1 Sep. 16, 2021

Related U.S. Application Data

(63) Continuation of application No. PCT/JP2019/030686, filed on Aug. 5, 2019.

(30) Foreign Application Priority Data

Dec. 27, 2018 (JP) ................................ 2018-246099

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/66* (2013.01);
(Continued)

(58) Field of Classification Search
CPC ......... H01M 10/0562; H01M 10/0565; H01M 10/0585; H01M 50/186; H01M 50/195;
(Continued)

(56) References Cited

U.S. PATENT DOCUMENTS

2009/0061297 A1 3/2009 Kimura
2017/0256816 A1* 9/2017 Watanabe ......... H01M 10/0562

FOREIGN PATENT DOCUMENTS

EP 3386005 A1 * 10/2018 ........ H01M 10/0413
JP 6-052866 2/1994
(Continued)

OTHER PUBLICATIONS

International Search Report of PCT application No. PCT/JP2019/030686 dated Nov. 5, 2019.
(Continued)

*Primary Examiner* — Christian Roldan
*Assistant Examiner* — Robert Gene West
(74) *Attorney, Agent, or Firm* — Rimon P.C.

(57) ABSTRACT

A battery includes a positive electrode current collector, a positive electrode active material layer, a solid electrolyte layer, a negative electrode active material layer, a negative electrode current collector, and a sealing member. In plan view, the negative electrode active material layer is larger than the solid electrolyte layer. In plan view, each of the positive electrode current collector and the negative electrode current collector is larger than the negative electrode active material layer. In plan view, the sealing member is located outside the solid electrolyte layer. In cross-sectional view perpendicular to a laminating direction, the sealing member is disposed in a region sandwiched between a part of the positive electrode current collector and a part of the negative electrode active material layer and a region sandwiched between another part of the positive electrode current collector and a part of the negative electrode current collector.

10 Claims, 11 Drawing Sheets

(51) Int. Cl.
    *H01M 4/66*     (2006.01)
    *H01M 10/0565*     (2010.01)
    *H01M 10/0585*     (2010.01)
    *H01M 50/184*     (2021.01)
    *H01M 50/186*     (2021.01)
    *H01M 50/191*     (2021.01)
    *H01M 50/193*     (2021.01)
    *H01M 50/195*     (2021.01)

(52) U.S. Cl.
    CPC ... *H01M 10/0565* (2013.01); *H01M 10/0585* (2013.01); *H01M 50/184* (2021.01); *H01M 50/186* (2021.01); *H01M 50/191* (2021.01); *H01M 50/193* (2021.01); *H01M 50/195* (2021.01); *H01M 2300/0065* (2013.01)

(58) Field of Classification Search
    CPC ............. H01M 50/184; H01M 50/193; H01M 50/191; H01M 4/1361; H01M 4/66
    See application file for complete search history.

(56) References Cited

FOREIGN PATENT DOCUMENTS

| | | | |
|---|---|---|---|
| JP | 2003-092092 | 3/2003 | |
| JP | 2007-005219 A | 1/2007 | |
| JP | 2007-273349 | 10/2007 | |
| JP | 2007-273350 | 10/2007 | |
| JP | 2017199668 A * | 11/2017 | ........ H01M 10/0562 |
| KR | 20090056879 A2 * | 6/2009 | |
| WO | WO-2018195372 A1 * | 10/2018 | ............ H01M 4/139 |

OTHER PUBLICATIONS

English Translation of Chinese Search Report dated Jul. 24, 2024 for the related Chinese Patent Application No.201980067204.8.

* cited by examiner

BATTERY

BACKGROUND

1. Technical Field

The present disclosure relates to a battery.

2. Description of the Related Art

Japanese Unexamined Patent Application Publication No. 2007-273350 discloses a battery including a battery element and an insulating resin disposed around the battery element.

SUMMARY

In the conventional technology, further improvement in the reliability and mountability has been desired.

One non-limiting and exemplary embodiment provides a battery with further improved reliability and mountability.

In one general aspect, the techniques disclosed here feature a battery including: a positive electrode current collector; a positive electrode active material layer disposed in contact with the positive electrode current collector; a solid electrolyte layer covering the positive electrode active material layer; a negative electrode active material layer disposed in contact with the solid electrolyte layer; a negative electrode current collector disposed in contact with the negative electrode active material layer; and a sealing member. In plan view, the area of the negative electrode active material layer is larger than the area of the solid electrolyte layer. In plan view, each of the area of the positive electrode current collector and the area of the negative electrode current collector is larger than the area of the negative electrode active material layer. In plan view, the sealing member is located outside the solid electrolyte layer. In cross-sectional view perpendicular to a laminating direction, the sealing member is disposed in a region sandwiched between a part of the positive electrode current collector and a part of the negative electrode active material layer in the laminating direction and a region sandwiched between another part of the positive electrode current collector and a part of the negative electrode current collector in the laminating direction.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
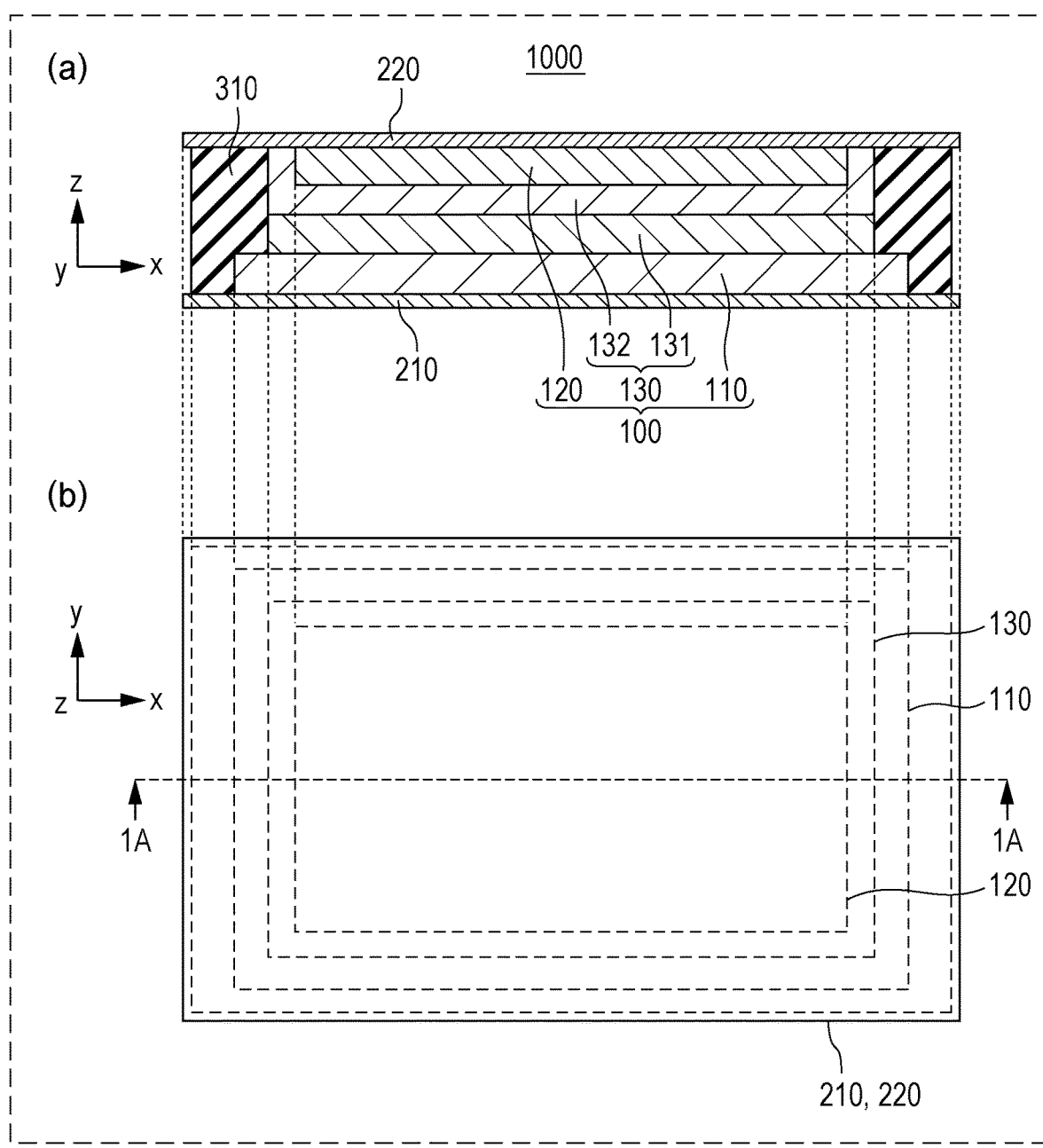
FIG. 1 shows illustrations of an example of a schematic structure of a battery in embodiment 1.

DETAILED DESCRIPTION (Overview of the Present Disclosure)

A battery in one aspect of the present disclosure includes: a positive electrode current collector; a positive electrode active material layer disposed in contact with the positive electrode current collector; a solid electrolyte layer covering the positive electrode active material layer; a negative electrode active material layer disposed in contact with the solid electrolyte layer; a negative electrode current collector disposed in contact with the negative electrode active material layer; and a sealing member. In plan view, the area of the negative electrode active material layer is larger than the area of the solid electrolyte layer. In plan view, each of the area of the positive electrode current collector and the area of the negative electrode current collector is larger than the area of the negative electrode active material layer. In plan view, the sealing member is located outside the solid electrolyte layer. In cross-sectional view perpendicular to a laminating direction, the sealing member is disposed in a region sandwiched between a part of the positive electrode current collector and a part of the negative electrode active material layer in the laminating direction and a region sandwiched between another part of the positive electrode current collector and a part of the negative electrode current collector in the laminating direction.

In this case, a region in which no solid electrolyte layer is formed is present on a side surface of the negative electrode active material layer. When the solid electrolyte layer is formed on the side surface of the negative electrode active material layer and on a stacking surface of the negative electrode active material layer that is located inside the side surface, a problem about mechanical strength due to non-uniformity in layer thickness and layer density is more likely to occur in the solid electrolyte layer on the side surface than in the solid electrolyte layer on the stacking surface. In this case, when the battery receives a shock, a micro-short circuit can occur, for example, when a portion of the side surface of the negative electrode active material layer comes close to a side surface of the positive electrode active material layer on which the solid electrolyte layer is formed. However, in the present disclosure, the solid electrolyte layer is not formed on the side surface of the negative electrode active material layer. Therefore, the occurrence of such a micro-short circuit is prevented, and the reliability of the battery can be further improved.

For example, the sealing member may be disposed in contact with the positive electrode current collector, the negative electrode active material layer, and the negative electrode current collector.

In this case, the negative electrode current collector and the positive electrode current collector can be firmly joined together through the sealing member. By joining the negative electrode current collector and the positive electrode current collector together near their outer circumferences through the sealing member, the positive electrode active material layer, the solid electrolyte layer, and the negative electrode active material layer included in the power generation element of the battery are encapsulated, and the power generation element can be protected from shock and outside air. Therefore, the reliability of the battery can be further improved.

For example, the sealing member may be in contact with a part of a stacking surface of the negative electrode active material layer.

In this case, the sealing member is disposed in contact with the stacking surface of the negative electrode active material layer in a region outside the solid electrolyte layer, and the negative electrode active material layer is thereby more firmly held by the sealing member. Therefore, even when a shock is applied to the battery during charging or discharging during which the negative electrode active material layer is expanded or contracted, delamination between the negative electrode active material layer and the solid electrolyte layer can be prevented, so that the reliability of the battery can be further improved.

For example, in plan view, the sealing member may have a shape protruding outward beyond at least one of the positive electrode current collector or the negative electrode current collector.

In this case, the sealing member protrudes outward beyond a side surface of the at least one of the negative electrode current collector or the positive electrode current collector. Therefore, when an external shock is applied, the negative electrode current collector and the positive electrode current collector receive less force directly, and a part of the impact force can be absorbed by the elasticity of the encapsulating material, so that breakage of the battery can be prevented. Therefore, the reliability of the battery can be further improved.

For example, the battery may have a space inside the sealing member or between the sealing member and at least one of the positive electrode active material layer, the solid electrolyte layer, or the negative electrode active material layer.

In this case, the sealing member has the space. Therefore, even when an external force is applied to the battery to cause the sealing member to deform, the space inside the sealing member or between the sealing member and the power generation element including the positive electrode active material layer, the solid electrolyte layer, and the negative electrode active material layer mitigates the shock, and the power generation element is prevented from receiving a mechanical shock. Therefore, collapse of the power generation element due to a mechanical shock such as an external force can be prevented, and the mechanical strength of the battery can be improved. When the power generation element is in contact with the space, even if gas is generated from the power generation element, for example, during charging or discharging, the pressure of the gas is relaxed by the space, and progress of delamination in the power generation element due to the gas generated can be prevented. Therefore, the reliability of the battery can be further improved.

For example, the sealing member may have a shape protruding into the solid electrolyte layer.

In this case, the solid electrolyte layer is supported by the protruding portion of the sealing member. Therefore, even when an external force is applied to the battery, collapse of the solid electrolyte layer can be prevented. The risk of breakage of the power generation element can thereby be reduced, and the reliability of the battery can be further improved.

The solid electrolyte layer may include a first solid electrolyte layer located on the negative electrode active material layer side and a second solid electrolyte layer located on the positive electrode active material layer side, and the sealing member may have a shape protruding between the first solid electrolyte layer and the second solid electrolyte layer.

In this case, the solid electrolyte layer is supported by the protruding portion of the sealing member. Therefore, even when an external force is applied to the battery, collapse of the solid electrolyte layer can be prevented. The risk of breakage of the power generation element can thereby be reduced, and the reliability of the battery can be further improved. Moreover, since the solid electrolyte layer is divided into two or more layers, the sealing member can be easily formed so as to have the shape protruding between the solid electrolyte layers, and the battery can be easily produced.

For example, the sealing member may include a first sealing member located on the negative electrode current collector side and containing a first material and a second sealing member located on the positive electrode current collector side and containing a second material different from the first material.

In this case, encapsulating materials optimal for the sealing members on the positive and negative electrode sides can be selected in terms of reactivity, mechanical properties, etc. Therefore, the reliability of the battery can be further improved.

For example, the sealing member may contain an insulating material having no ionic conductivity.

In this case, since the material of the sealing member is the insulating material, the continuity between the negative electrode current collector and the positive electrode current collector can be prevented. Moreover, since the material of the sealing member has no ionic conductivity, a reduction in the battery characteristics due to, for example, contact between the encapsulating material and another battery member can be prevented. Therefore, the reliability of the battery can be further improved.

For example, the sealing member may contain a resin or a sealing material.

In this case, since the sealing member contains the resin or the sealing material, even when an external force is applied to the battery or the battery is exposed to a humid atmosphere or a gas component, the flexibility, pliability, and gas barrier properties of the sealing member prevent adverse effects on the power generation element. Therefore, the reliability of the battery can be further improved.

For example, the sealing member may contain at least one selected from the group consisting of epoxy resins, acrylic resins, polyimide resins, and silsesquioxanes.

The epoxy resins, the acrylic resins, the polyimide resins, and the silsesquioxanes are materials that have flowability in their initial state and can be cured by subjecting the materials to UV irradiation or heat treatment to cause the materials to lose their flowability. Therefore, the sealing member can be formed using any of these easily curable materials. If necessary, preliminary curing using heat treatment or UV irradiation may be performed, and then final curing may be performed using heat treatment or UV irradiation. In this manner, the deformation of the sealing member in each production step can be prevented.

For example, the sealing member may contain a particulate metal oxide material.

In this case, for example, the characteristics of the sealing member such as the ability to retain the shape of the battery, insulating properties, heat conductivity, and moisture resistance can be further improved.

Embodiments of the present disclosure will next be described with reference to the drawings.

The embodiments described below show general or specific examples. Numerical values, shapes, materials, components, arrangements and connections of the components, steps, the order of the steps, etc. shown in the following embodiments are merely examples and are not intended to limit the present disclosure. Among the components in the following embodiments, components not described in an independent claim will be described as optional components.

The drawings are schematic drawings and are not necessarily strictly accurate illustrations. Therefore, the scales etc. in the drawings do not always agree with each other. In the drawings, the same reference numerals are given to substantially the same components, and redundant description thereof will be omitted or simplified.

In the present specification, terms, such as parallel, representing the relations between components, terms, such as rectangular, representing the shapes of components, and numerical ranges do not represent only their strict meanings but are intended to include those in substantially the same range, e.g., with a few percent difference.

In the present specification and the drawings, x, y, and z axes are the three axes of a three-dimensional orthogonal coordinate system. In each embodiment, the z axis direction is the direction of the thickness of the battery. In the present specification, "the thickness direction" is a direction perpendicular to the stacking surfaces of the layers.

In the present specification, the phrase "in plan view" means that the battery is viewed in its laminating direction. In the present specification, "the thicknesses" of the battery and each layer are their lengths in the laminating direction. In the present specification, "the stacking surface" is a surface of the battery when the battery is viewed in the laminating direction. Specifically, "the stacking surface" is a surface intersecting the laminating direction. For example, the stacking surface is a surface substantially perpendicular to the laminating direction. In the present specification, "a side surface" of the battery is its surface when the battery is viewed in a direction perpendicular to the laminating direction of the battery. Specifically, "the side surface" is a surface intersecting a direction perpendicular to the laminating direction. For example, the side surface is a surface substantially parallel to the laminating direction.

In the present specification, the terms "outside," "outward," "outer," "inside," "inward," and "inner" are those when the battery is viewed in the laminating direction of the battery.

In the present specification, the terms "above" and "below" in the structure of the battery do not refer to an upward direction (vertically above) and a downward direction (vertically below), respectively, in space recognition in an absolute manner but are used to define relative positional relations based on the stacking order in the stacked structure. The terms "above" and "below" are used not only when two components are disposed with a space therebetween and another component is present between the two components but also when two components are disposed in contact with each other.

Embodiment 1

FIG. 1 shows cross-sectional views illustrating a schematic structure of a battery 1000 in embodiment 1. Specifically, FIG. 1(*a*) is a cross-sectional view showing the schematic structure of the battery 1000 and shows a cross section taken along line 1A-1A in FIG. 1(*b*). FIG. 1(*b*) is a transparent top view showing the schematic structure of the battery 1000. In FIG. 1(*b*), the shapes of components of the battery 1000 in plan view when the battery 1000 is viewed from above are represented by solid or broken lines.

As shown in FIG. 1, the battery 1000 in embodiment 1 includes a power generation element 100, a negative electrode current collector 210, a positive electrode current collector 220, and a sealing member 310. More specifically, the battery 1000 includes: the positive electrode current collector 220; a positive electrode active material layer 120 disposed in contact with the positive electrode current collector 220; a solid electrolyte layer 130 covering the positive electrode active material layer 120; a negative electrode active material layer 110 disposed in contact with the solid electrolyte layer 130; the negative electrode current collector 210 disposed in contact with the negative electrode active material layer 110; and the sealing member 310.

In plan view, the area of the negative electrode active material layer 110 is larger than the area of the solid electrolyte layer 130. In plan view, the area of the positive electrode current collector 220 and the area of the negative electrode current collector 210 are larger than the area of the negative electrode active material layer 110. In plan view, the sealing member 310 is located outside the solid electrolyte layer 130. In cross-sectional view perpendicular to the laminating direction, the sealing member 310 is disposed in a region sandwiched between a part of the positive electrode current collector 220 and a part of the negative electrode active material layer 110 in the laminating direction and in a region sandwiched between another part of the positive electrode current collector 220 and a part of the negative electrode current collector 210. In the present disclosure, "in cross-sectional view perpendicular to the laminating direction" is the case where a cross section parallel to the laminating direction is viewed in a direction perpendicular to the laminating direction, as in FIG. 1(*a*).

The sealing member 310 is disposed in contact with the positive electrode current collector 220, the negative electrode active material layer 110, and the negative electrode current collector 210. Moreover, the sealing member 310 is in contact with a stacking surface of the negative electrode active material layer 110. In plan view, a part of the sealing member 310 may be disposed on the inner side of the solid electrolyte layer 130.

The power generation element 100 is disposed between the negative electrode current collector 210 and the positive electrode current collector 220. As shown in FIG. 1, the power generation element 100 includes the negative electrode active material layer 110 and the positive electrode active material layer 120. The power generation element 100 further includes the solid electrolyte layer 130. The negative electrode active material layer 110, the solid electrolyte layer 130, and the positive electrode active material layer 120 are stacked in this order from the negative electrode current collector 210 side in the thickness direction of the battery 1000 (the z axis direction).

The negative electrode active material layer 110 contains, for example, a negative electrode active material as an electrode material. The negative electrode active material layer 110 is disposed so as to face the positive electrode active material layer 120.

A negative electrode active material such as graphite or metallic lithium can be used as the negative electrode active material contained in the negative electrode active material layer 110. The negative electrode active material used may be any of various materials that can occlude and release ions such as lithium (Li) ions or magnesium (Mg) ions.

A solid electrolyte such as an inorganic solid electrolyte may be used as a component material of the negative electrode active material layer 110. For example, a sulfide solid electrolyte or an oxide solid electrolyte may be used as the inorganic solid electrolyte. For example, a mixture of lithium sulfide ($Li_2S$) and diphosphorus pentasulfide ($P_2S_5$) may be used as the sulfide solid electrolyte. A conductive material such as acetylene black, Ketjen black, carbon black, graphite, or carbon fibers and a binder such as polyvinylidene fluoride may be used as component materials of the negative electrode active material layer 110. Other examples of the binder include: synthetic rubbers such as butadiene rubber, isoprene rubber, styrene-butadiene rubber (SBR), styrene-butadiene-styrene (SBS) copolymers, styrene-ethylene-butadiene-styrene (SEBS) copolymers, ethylene-propylene rubber, butyl rubber, chloroprene rubber, acrylonitrile-butadiene rubber, acrylic rubber, silicone rubber, fluorocarbon rubber, and urethane rubber; polyvinylidene fluoride-hexafluoropropylene (PVDF-HFP) copolymers; polyimides; polyamides; polyamide-imides; polyvinyl alcohols; and chlorinated polyethylenes (CPE).

The negative electrode active material layer 110 may be produced, for example, by kneading the component materials of the negative electrode active material layer 110 with a solvent to prepare a paste-like coating material, applying the coating material to the surface of the negative electrode current collector 210, and drying the coating material. To increase the density of the negative electrode active material layer 110, a negative electrode plate including the negative electrode active material layer 110 and the negative electrode current collector 210 may be pressed after drying. The thickness of the negative electrode active material layer 110 is, for example, equal to or more than 5 μm and equal to or less than 300 μm but is not limited thereto.

The positive electrode active material layer 120 is a layer containing a positive electrode material such as an active material. The positive electrode material is a material forming a counter electrode of the negative electrode material. The positive electrode active material layer 120 contains, for example, a positive electrode active material.

A positive electrode active material such as lithium cobaltate complex oxide (LCO), lithium nickelate complex oxide (LNO), lithium manganate complex oxide (LMO), lithium-manganese-nickel complex oxide (LMNO), lithium-manganese-cobalt complex oxide (LMCO), lithium-nickel-cobalt complex oxide (LNCO), or lithium-nickel-manganese-cobalt complex oxide (LNMCO) can be used as the positive electrode active material contained in the positive electrode active material layer 120.

The positive electrode active material used may be any of various materials that can occlude and release ions such as lithium ions or magnesium ions.

A solid electrolyte such as an inorganic solid electrolyte may be used as a component material of the positive electrode active material layer 120. A sulfide solid electrolyte, an oxide solid electrolyte, etc. may be used as the inorganic solid electrolyte. For example, a mixture of lithium sulfide ($Li_2S$) and diphosphorus pentasulfide ($P_2S_5$) may be used as the sulfide solid electrolyte. The surface of the positive electrode active material may be coated with a solid electrolyte. A conductive material such as acetylene black and a binder such as polyvinylidene fluoride may be used as component materials of the positive electrode active material layer 120. Any of the above described materials used for the negative electrode active material layer 110 may be used as the conductive material and the binder.

The positive electrode active material layer 120 can be produced, for example, by kneading the component materials of the positive electrode active material layer 120 with a solvent to prepare a paste-like coating material, applying the coating material to the surface of the positive electrode current collector 220, and drying the coating material. To increase the density of the positive electrode active material layer 120, a positive electrode plate including the positive electrode active material layer 120 and the positive electrode current collector 220 may be pressed after drying. The thickness of the positive electrode active material layer 120 is, for example, equal to or more than 5 μm and equal to or less than 300 μm but is not limited thereto.

The solid electrolyte layer 130 is disposed between the negative electrode active material layer 110 and the positive electrode active material layer 120. The solid electrolyte layer 130 is in contact with the negative electrode active material layer 110 and with the positive electrode active material layer 120. The solid electrolyte layer 130 is a layer containing an electrolyte material. The electrolyte material used may be a well-known electrolyte for batteries. The thickness of the solid electrolyte layer 130 may be equal to or more than 5 μm and equal to or less than 300 μm and may be equal to or more than 5 μm and equal to or less than 100 μm.

The solid electrolyte layer 130 may contain a solid electrolyte. The battery 1000 including the power generation element 100 may be, for example, an all-solid-state battery.

The solid electrolyte layer 130 includes: a negative electrode-side solid electrolyte layer 131 that covers mainly the negative electrode active material layer 110; and a positive electrode-side solid electrolyte layer 132 that covers mainly the positive electrode active material layer 120. A layer formed by integrating the negative electrode-side solid electrolyte layer 131 and the positive electrode-side solid electrolyte layer 132 may be used as the solid electrolyte layer 130. When the negative electrode-side solid electrolyte layer 131 and the positive electrode-side solid electrolyte layer 132 are formed integrally, the negative electrode-side solid electrolyte layer 131 and the positive electrode-side solid electrolyte layer 132 in the present embodiment are joined together at an internal surface parallel to the solid electrolyte layer 130.

The solid electrolyte used may be, for example, an inorganic solid electrolyte. The inorganic solid electrolyte used may be, for example, a sulfide solid electrolyte, an oxide solid electrolyte, or a halide solid electrolyte. For example, a mixture of lithium sulfide ($Li_2S$) and diphosphorus pentasulfide ($P_2S_5$) may be used as the sulfide solid electrolyte. The solid electrolyte layer 130 may contain, in addition to the electrolyte material, a binder such as polyvinylidene fluoride. The binder used may be any of the above-described materials used for the negative electrode active material layer 110.

In embodiment 1, the negative electrode active material layer 110, the positive electrode active material layer 120, and the solid electrolyte layer 130 are maintained in parallel flat shapes. In this case, the occurrence of cracking or collapse due to bending can be prevented. The negative electrode active material layer 110, the positive electrode active material layer 120, and the solid electrolyte layer 130 may be smoothly bent together.

The negative electrode current collector 210 and the positive electrode current collector 220 are each an electrically conductive member. The negative electrode current collector 210 and the positive electrode current collector 220 may each be an electrically conductive thin film. A metal such as stainless steel (SUS), aluminum (Al), or copper (Cu) can be used as the material forming the negative electrode current collector 210 and the positive electrode current collector 220.

The negative electrode current collector 210 is disposed in contact with the negative electrode active material layer 110. The negative electrode current collector used may be, for example, a metal foil such as a SUS foil or a Cu foil. The thickness of the negative electrode current collector 210 is, for example, equal to or more than 5 µm and equal to or less than 100 µm but is not limited thereto. The negative electrode current collector 210 may include, for example, a current collector layer containing an electrically conductive material in a portion in contact with the negative electrode active material layer 110.

The positive electrode current collector 220 is disposed in contact with the positive electrode active material layer 120. The positive electrode current collector 220 used may be, for example, a metal foil such as a SUS foil or an Al foil. The thickness of the positive electrode current collector 220 is, for example, equal to or more than 5 µm and equal to or less than 100 µm but is not limited thereto. The positive electrode current collector 220 may include, for example, a current collector layer containing an electrically conductive material in a portion in contact with the positive electrode active material layer 120.

The sealing member 310 is disposed between the negative electrode current collector 210 and the positive electrode current collector 220. The sealing member 310 is disposed in contact with the side surfaces of the power generation element 100. Specifically, the sealing member 310 is disposed so as to fully cover the power generation element 100. The sealing member 310 is formed using, for example, an electrically insulating material. The sealing member 310 functions as a spacer for maintaining the gap between the negative electrode current collector 210 and the positive electrode current collector 220.

The sealing member 310 contains, for example, a first material. The sealing member 310 may be, for example, a member containing the first material as a main component. For example, the sealing member 310 may be composed only of the first material.

A well-known material for sealing members of batteries such as a sealing material may be used as the first material. Examples of the sealing material include ceramic-based sealing materials and resin-based sealing materials. The first material may contain an insulating material having no ionic conductivity. The first material contained may be a resin material. For example, the first material may contain any of thermosetting resins, photocurable resins such as UV curable resins, and hot-melt resins (thermoplastic resins). For example, the first material may contain at least one of a thermosetting or photocurable epoxy resin, a thermosetting or photocurable acrylic resin, a thermosetting or photocurable polyimide resin, or a thermosetting or photocurable silsesquioxane.

The sealing member 310 may contain a particulate metal oxide material. The metal oxide material used may be, for example, silicon oxide, aluminum oxide, titanium oxide, zinc oxide, cerium oxide, iron oxide, tungsten oxide, zirconium oxide, calcium oxide, zeolite, or glass. For example, the sealing member 310 may be formed using a resin material containing a plurality of metal oxide material particles dispersed therein.

It is only necessary that the particle size of the metal oxide material be equal to or smaller than the gap between the negative electrode current collector 210 and the positive electrode current collector 220. The shape of the metal oxide material particles may be circular (spherical), ellipsoidal, or a rod-like shape.

In plan view, a region in which the negative electrode active material layer 110 is formed is smaller than a region in which the negative electrode current collector 210 is formed and a region in which the positive electrode current collector 220 is formed and is located inside these regions. In plan view, a region in which the solid electrolyte layer 130 is formed is smaller than the region in which the negative electrode current collector 210 is formed, the region in which the positive electrode current collector 220 is formed, and the region in which the negative electrode active material layer 110 is formed and is located inside these regions.

Moreover, in plan view, the region in which the positive electrode active material layer 120 is formed is smaller than the region in which the solid electrolyte layer 130 is formed and is located inside this region. In plan view, the negative electrode current collector 210 and the positive electrode current collector 220 are formed in the same position. Therefore, a part of the positive electrode current collector 220 is disposed in a region facing the part of the negative electrode active material layer 110 which is located near its outer circumference and to which the solid electrolyte layer 130 is not joined. Another part of the positive electrode current collector 220 is disposed in a region facing the part of the negative electrode current collector 210 which is located near its outer circumference and to which the negative electrode active material layer 110 is not joined.

In the above structure in plan view, the region in which the negative electrode active material layer 110 is formed is smaller than the region in which the negative electrode current collector 210 is formed, so that the sealing member 310 can be disposed in contact with a surface of the negative electrode current collector 210 in a region outside the negative electrode active material layer 110. Therefore, the negative electrode active material layer 110 can be protected from shock and outside air. Moreover, in plan view, since the region in which the negative electrode active material layer 110 is formed is smaller than the region in which the negative electrode current collector 210 is formed, the sealing member 310 can be disposed in contact also with the side surfaces of the negative electrode active material layer 110. In this case, the negative electrode active material layer 110 can be supported by the sealing member 310, so that collapse of the side surfaces of the negative electrode active material layer 110 can be prevented.

In plan view, the region in which the solid electrolyte layer 130 is formed is smaller than the region in which the negative electrode active material layer 110 is formed, so that the sealing member 310 can be disposed in contact with a part of a principal surface (i.e., a stacking surface) of the negative electrode active material layer 110 in a region outside the solid electrolyte layer 130. Therefore, the portions of the negative electrode active material layer 110 that are located near its edges can be supported from its side surfaces and its principal surface (i.e., its stacking surface), so that collapse of the end faces of the negative electrode active material layer 110 can be more effectively prevented.

In plan view, the region in which the positive electrode active material layer 120 is formed is smaller than the region in which the solid electrolyte layer 130 is formed. Therefore, all the surfaces of the positive electrode active material layer 120 including the side surfaces and the stacking surface but excluding the surface in contact with the positive electrode current collector 220 are covered with the solid electrolyte layer 130, and the positive electrode active material layer 120 can be joined so as to face the negative electrode active material layer 110 with the solid electrolyte layer 130 interposed therebetween. In this case, the capacity of the battery can be precisely designed using the area of the positive electrode active material layer 120, so that the accuracy of the capacity of the battery can be increased. Moreover, the entire positive electrode active material layer 120 can undergo an electrochemical reaction uniformly, so that the long-term reliability of the battery can be improved.

Since a part of the positive electrode current collector 220 is disposed in a region facing the part of the negative electrode active material layer 110 which is located near its outer circumference and to which the solid electrolyte layer 130 is not joined, the sealing member 310 can be disposed in contact with both a part of the principal surface (i.e., the stacking surface) of the negative electrode active material layer 110 and a part of a principal surface (i.e., a stacking surface) of the positive electrode current collector 220. Since another part of the positive electrode current collector 220 is disposed in a region facing the part of the negative electrode current collector 210 which is located near its outer circumference and to which the negative electrode active material layer 110 is not joined, the sealing member 310 can be disposed in contact with both a part of a principal surface of the negative electrode current collector 210 and another part of the principal surface of the positive electrode current collector 220 that face each other. Therefore, the negative electrode current collector 210 and the positive electrode current collector 220 can be firmly joined to each other through the sealing member 310. Since the entire region of the negative electrode current collector 210 that is located near its outer circumference and the entire region of the positive electrode current collector 220 that is located near its outer circumference are firmly joined together through the sealing member 310, the power generation element 100 of the battery is encapsulated, and the power generation element 100 can be protected from shock and outside air.

Figure 8:
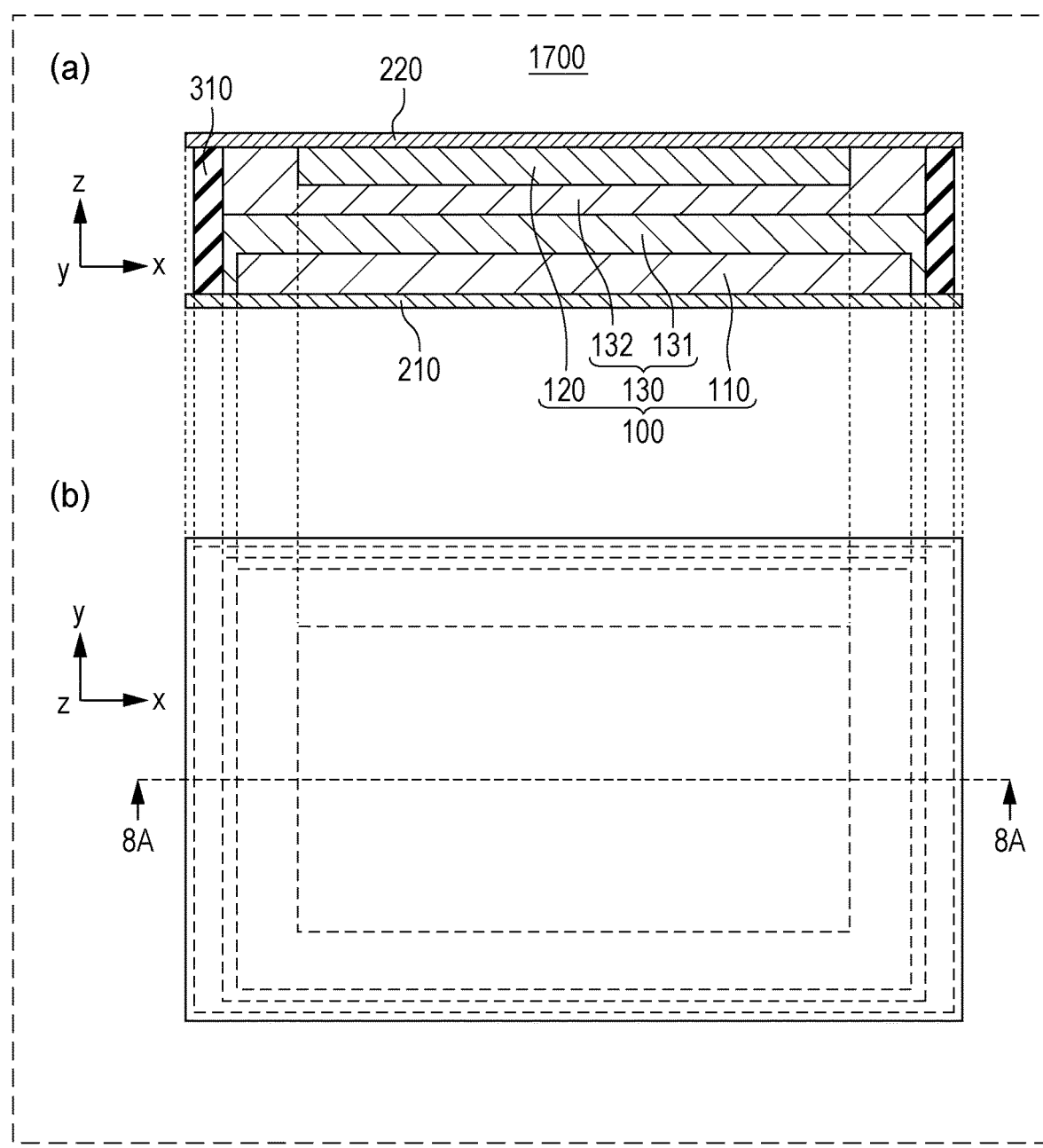
FIG. 8 shows illustrations of a schematic structure of a battery in a comparative example.

FIG. 8 shows illustrations of a schematic structure of a battery in a comparative example. In the battery 1700 in the comparative example shown in FIG. 8, a principal surface (i.e., a stacking surface) of the negative electrode active material layer 110 facing the positive electrode current collector 220 is entirely covered with the solid electrolyte layer 130. Therefore, in plan view, the portion in which only the sealing member 310 is present and the portion in which only the solid electrolyte layer 130 is present may be formed between the positive electrode current collector 220 and the negative electrode current collector 210. In this case, when a shock is applied to the battery 1700 or when the negative electrode active material layer 110 is expanded or contracted during charging or discharging, a force is applied between the negative electrode current collector 210 and the solid electrolyte layer 130, so that the joint between the negative electrode current collector 210 and the solid electrolyte layer 130 may become insufficient. This may lead to deterioration in the encapsulating structure.

However, in the battery 1000 in embodiment 1 in FIG. 1, the region in which the solid electrolyte layer 130 is formed is smaller in plan view than the region in which the negative electrode active material layer 110 is formed. Therefore, the sealing member 310 can be disposed in contact with the stacking surface of the negative electrode active material layer 110 in the region outside the solid electrolyte layer 130. In this case, the negative electrode active material layer 110 is firmly held by the sealing member 310. Therefore, even when a shock is applied to the battery or when the negative electrode active material layer 110 is expanded or contracted during charging or discharging, delamination of the solid electrolyte layer 130 can be prevented, so that the reliability of the battery can be improved.

In the battery 1700 in the comparative example in FIG. 8, the entire principal surface of the negative electrode active material layer 110 facing the positive electrode current collector 220 is covered with the solid electrolyte layer 130. In this case, the portion of the solid electrolyte layer 130 that is formed on the side surfaces of the negative electrode active material layer 110 and the portion of the solid electrolyte layer 130 that is formed on the side surfaces of the positive electrode active material layer 120 face each other and can come close to each other. In the portion of the solid electrolyte layer 130 that is formed on the side surfaces of the negative electrode active material layer 110 and the portion of the solid electrolyte layer 130 that is formed on the side surfaces of the positive electrode active material layer 120, a problem about mechanical strength due to nonuniformity in layer thickness and layer density is more likely to occur than in the portion of the solid electrolyte layer 130 that is formed on the principal surface (i.e., the stacking surface) of the negative electrode active material layer 110 in a region inside its side surfaces and the portion of the solid electrolyte layer 130 that is formed on the principal surface (i.e., the stacking surface) of the positive electrode active material layer 120 in a region inside its side surfaces. Therefore, when these portions on the positive and negative electrode sides come close to each other, a microshort circuit is likely to occur when the battery 1700 receives a shock.

In the battery 1000 in embodiment 1 in FIG. 1, the region in which the solid electrolyte layer 130 is formed is smaller in pan view than the region in which the negative electrode active material layer 110 is formed. In this case, since the solid electrolyte layer 130 is not formed on the side surfaces of the negative electrode active material layer 110, the reliability of the battery can be improved.

[Modifications]

A plurality of modifications of embodiment 1 will be described. In the following description of the plurality of modifications, differences from embodiment 1 or differences between the modifications will be mainly described, and the description of common features will be omitted or simplified.

<Modification 1>

Figure 2:
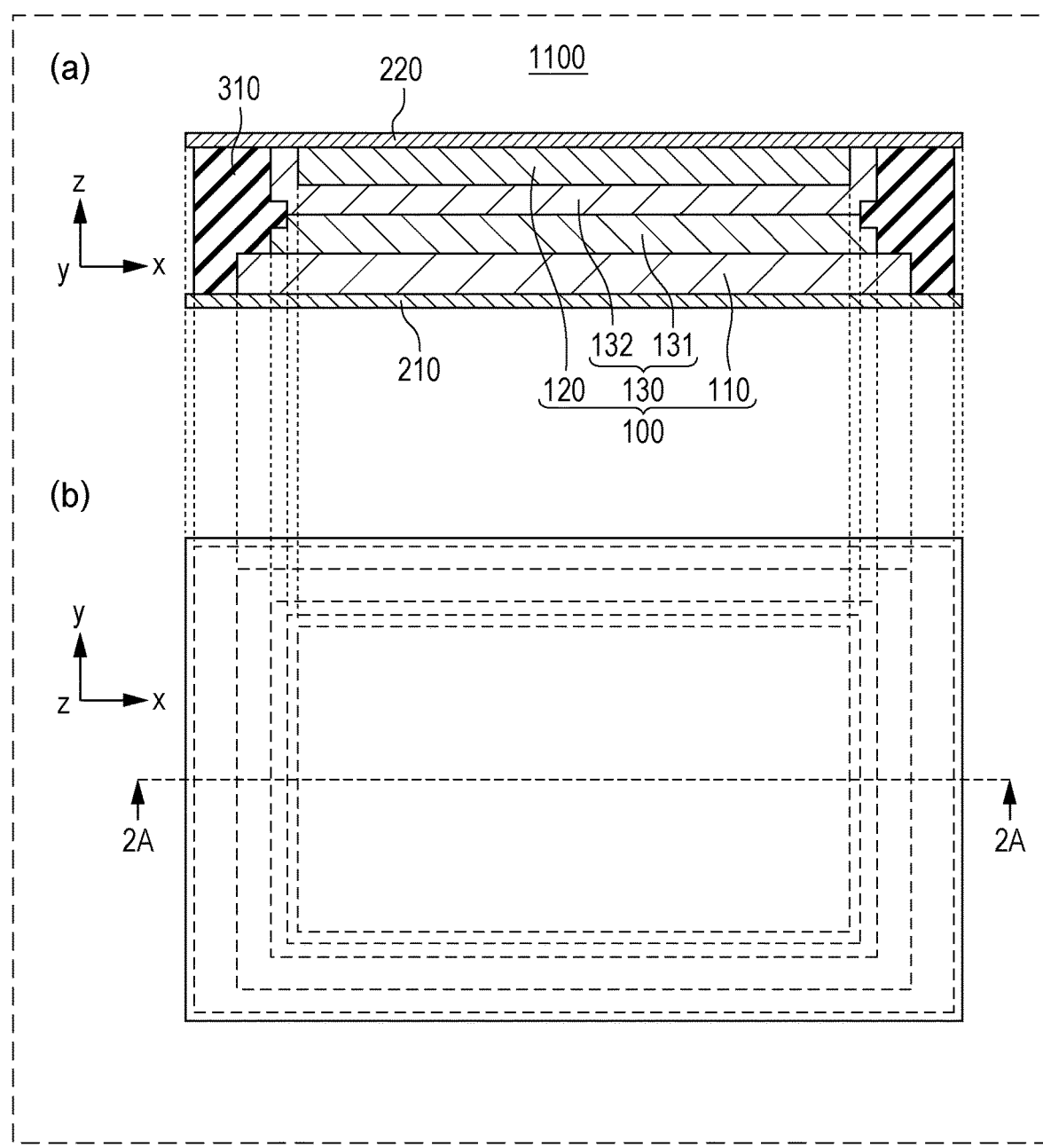
FIG. 2 shows illustrations of an example of a schematic structure of a battery in modification 1 of embodiment 1.

First, modification 1 of embodiment 1 will be described using FIG. 2. FIG. 2 shows illustrations of a schematic structure of a battery 1100 in modification 1 of embodiment 1. Specifically, FIG. 2(a) is a cross-sectional view showing the schematic structure of the battery 1100 and shows a cross section taken along line 2A-2A in FIG. 2(b). FIG. 2(b) is a transparent top view showing the schematic structure of the battery 1100. In FIG. 2(b), the shapes of components of the battery 1100 in plan view when the battery 1100 is viewed from above are represented by solid or broken lines.

As shown in FIG. 2, in the battery 1100, the sealing member 310 protrudes between the negative electrode-side solid electrolyte layer 131 on the negative electrode active material layer 110 side and the positive electrode-side solid electrolyte layer 132 on the positive electrode active material layer 120 side. In this case, the solid electrolyte layer 130 can be held more firmly, so that the reliability of the battery can be further improved.

<Modification 2>

Figure 3:
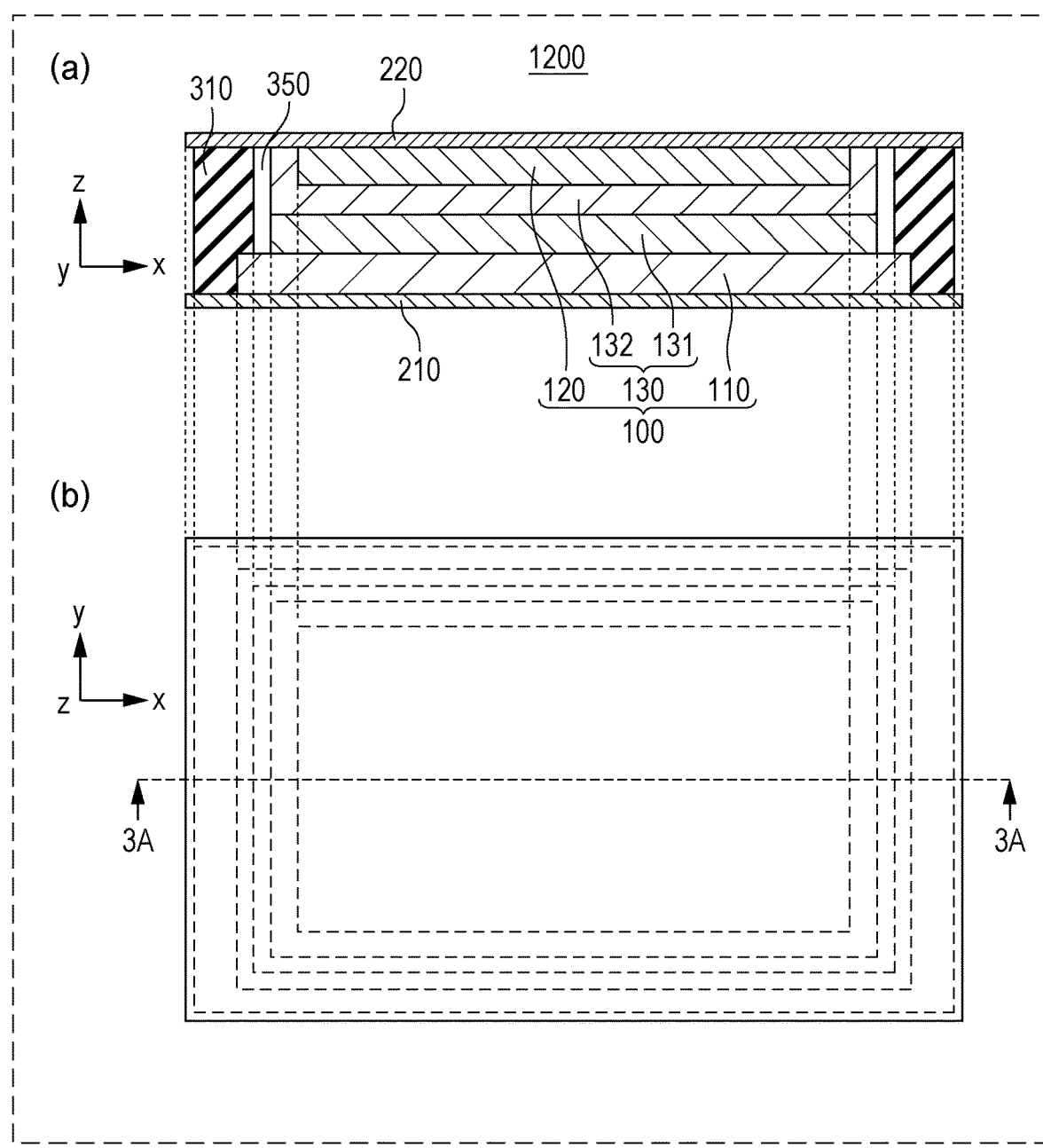
FIG. 3 shows illustrations of an example of a schematic structure of a battery in modification 2 of embodiment 1.

Modification 2 of embodiment 1 will be described using FIG. 3. FIG. 3 shows illustrations of a schematic structure of a battery 1200 in modification 2 of embodiment 1. Specifically, FIG. 3(a) is a cross-sectional view showing the schematic structure of the battery 1200 and shows a cross section taken along line 3A-3A in FIG. 3(b). FIG. 3(b) is a transparent top view showing the schematic structure of the battery 1200. In FIG. 3(b), the shapes of components of the battery 1200 in plan view when the battery 1200 is viewed from above are represented by solid or broken lines.

As shown in FIG. 3, in the battery 1200, a gap 350 is present between the sealing member 310 and the solid electrolyte layer 130. A part of the gap 350 is in contact also with a part of the negative electrode active material layer 110. The gap 350 is filled with a gas. The gas is, for example, air but may be a noble gas such as argon or nitrogen. The pressure inside gap 350 may be lower than the atmospheric pressure. The gap 350 is an example of the space.

When an external shock is applied in a side surface direction of the battery 1200 or when the negative electrode active material layer 110 and the positive electrode active material layer 120 are expanded or contracted during charging or discharging to cause them to deform, stress occurs. However, the gap 350 allows the stress caused by the external shock or the deformation to be partially relieved, so that the reliability of the battery can be further improved.

Moreover, since the power generation element 100 is in contact with the gap 350, even when a gas is generated from the power generation element 100 during charging or discharging, the pressure of the gas is relaxed by the gap 350, so that delamination in the power generation element 100 caused by the gas generated can be prevented from proceeding.

<Modification 3>

Figure 4:
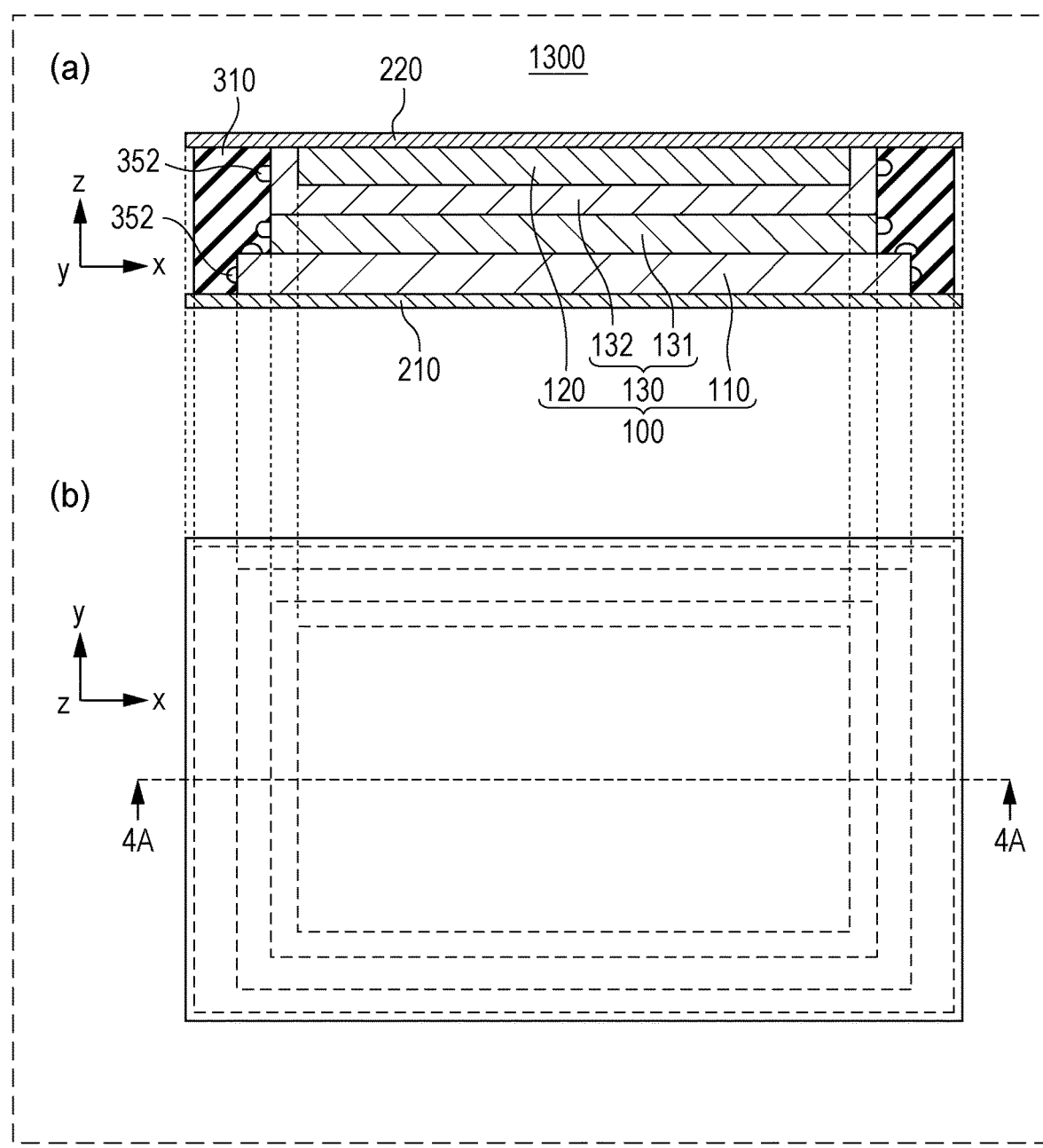
FIG. 4 shows illustrations of an example of a schematic structure of a battery in modification 3 of embodiment 1.

Modification 3 of embodiment 1 will be described using FIG. 4. FIG. 4 shows illustrations of a schematic structure of a battery 1300 in modification 3 of embodiment 1. Specifically, FIG. 4(a) is a cross-sectional view showing the schematic structure of the battery 1300 and shows a cross section taken along line 4A-4A in FIG. 4(b). FIG. 4(b) is a transparent top view showing the schematic structure of the battery 1300. In FIG. 4(b), the shapes of components of the battery 1300 in plan view when the battery 1300 is viewed from above are represented by solid or broken lines.

As show in FIG. 4, a part of the sealing member 310 is joined to the solid electrolyte layer 130, and the battery 1300 includes voids 352 located between the sealing member 310 and the solid electrolyte layer 130 and between the sealing member 310 and the negative electrode active material layer 110. Each of the voids 352 is a space surrounded by the sealing member 310 and the solid electrolyte layer 130 or by the sealing member 310 and the negative electrode active material layer 110. The voids 352 are filled with a gas. The gas is, for example, air but may be a noble gas such as argon or nitrogen. The pressure inside the voids 352 may be lower than the atmospheric pressure.

In this case, while the sealing member 310 prevents collapse of the solid electrolyte layer 130, the voids 352 can reduce damage to the power generation element 100 when the battery 1300 receives a shock, and the reliability of the battery against a shock can thereby be increased.

Moreover, even when a gas is generated from the power generation element 100 during charging or discharging, the voids 352 relax the pressure of the gas, and the progress of delamination in the power generation element 100 due to the gas generated can be prevented.

<Modification 4>

Figure 5:
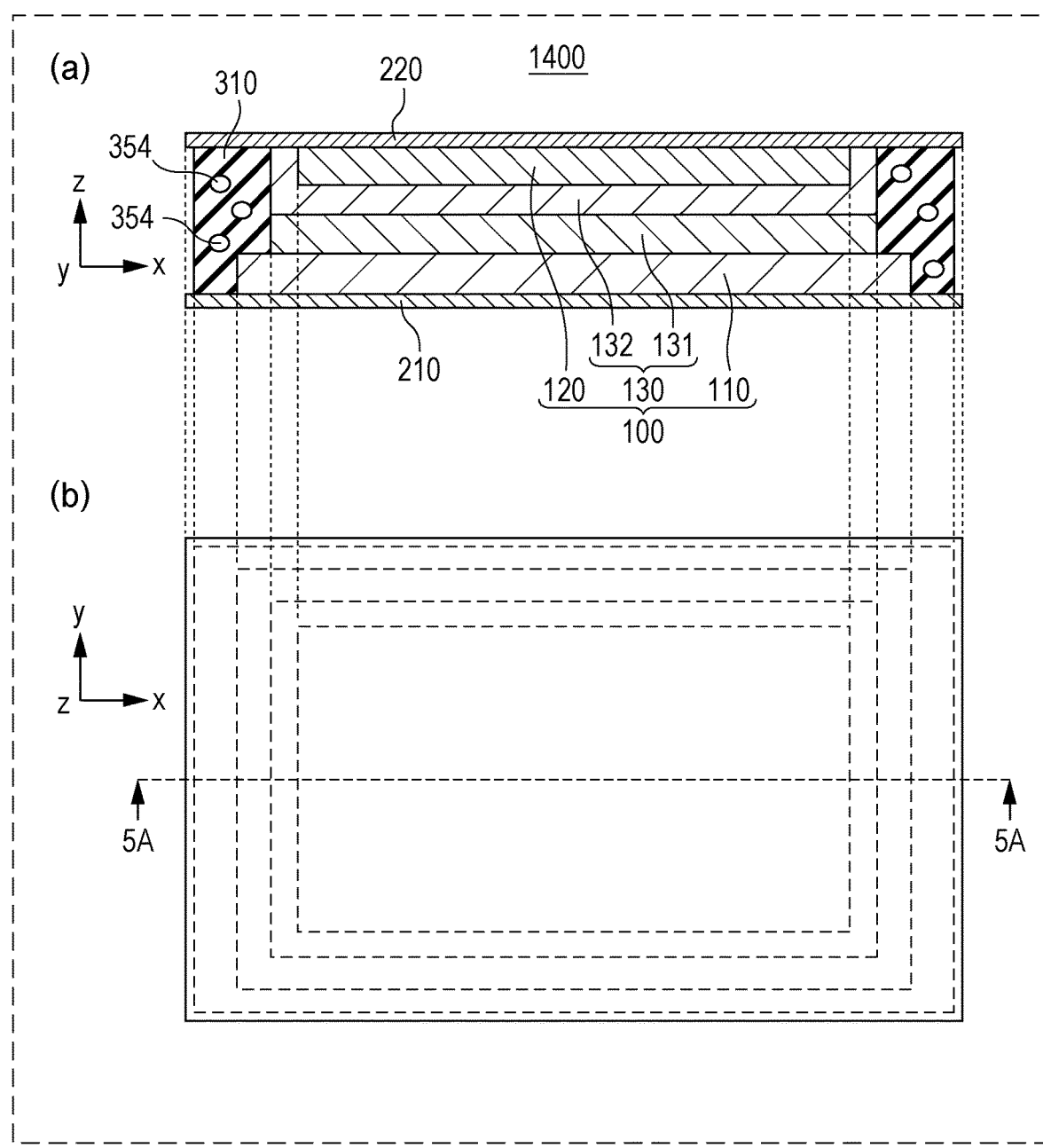
FIG. 5 shows illustrations of an example of a schematic structure of a battery in modification 4 of embodiment 1.

Modification 4 of embodiment 1 will be described using FIG. 5. FIG. 5 shows illustrations of a schematic structure of a battery 1400 in modification 4 of embodiment 1. Specifically, FIG. 5(a) is a cross-sectional view showing the schematic structure of the battery 1400 and shows a cross section taken along line 5A-5A in FIG. 5(b). FIG. 5(b) is a transparent top view showing the schematic structure of the battery 1400. In FIG. 5(b), the shapes of components of the battery 1400 in plan view when the battery 1400 is viewed from above are represented by solid or broken lines.

As shown in FIG. 5, in the battery 1400, the sealing member 310 has fine cavities 354 having a diameter smaller than the thickness and width of the power generation element. Specifically, the battery 1400 has the cavities 354 located inside the sealing member 310. The cavities 354 are independent cavities located inside the sealing member 310 and fully surrounded by the sealing member 310. The cavities 354 are filled with a gas. The gas is, for example, air but may be a noble gas such as argon or nitrogen. The pressure inside the cavities 354 may be lower than the atmospheric pressure. Each cavity 354 is an example of the space.

In this case, damage to the power generation element 100 when the battery 1400 receives a shock can be reduced by the deformation of the cavities 354 in the sealing member 310, so that the reliability of the battery against a shock can be increased.

<Modification 5>

Figure 6:
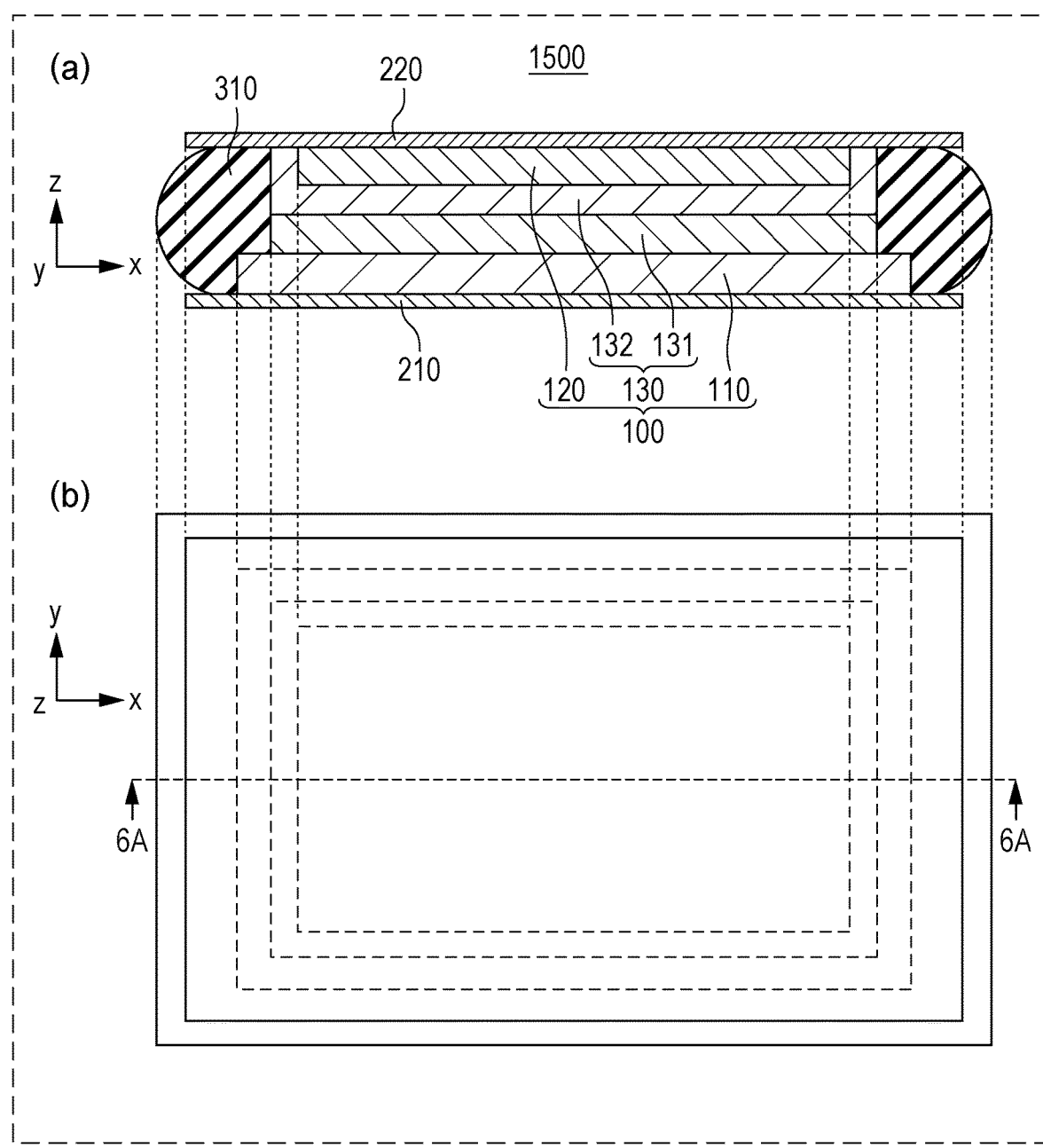
FIG. 6 shows illustrations of an example of a schematic structure of a battery in modification 5 of embodiment 1.

Modification 5 of embodiment 1 will be described using FIG. 6. FIG. 6 shows illustrations of a schematic structure of a battery 1500 in modification 5 of embodiment 1. Specifically, FIG. 6(a) is a cross-sectional view showing the schematic structure of the battery 1500 and shows a cross section taken along line 6A-6A in FIG. 6(b). FIG. 6(b) is a transparent top view showing the schematic structure of the battery 1500. In FIG. 6(b), the shapes of components of the battery 1500 in plan view when the battery 1500 is viewed from above are represented by solid or broken lines.

As shown in FIG. 6, in the battery 1500, the sealing member 310 protrudes outward beyond the side surfaces of the negative electrode current collector 210 and the side surfaces of the positive electrode current collector 220. In this case, even when an external shock is applied, the application of a force directly to the negative electrode current collector 210 and the positive electrode current collector 220 can be easily avoided, and a part of the impact force can be absorbed by the elasticity of the sealing member 310, so that breakage of the battery can be prevented.

<Modification 6>

Figure 7:
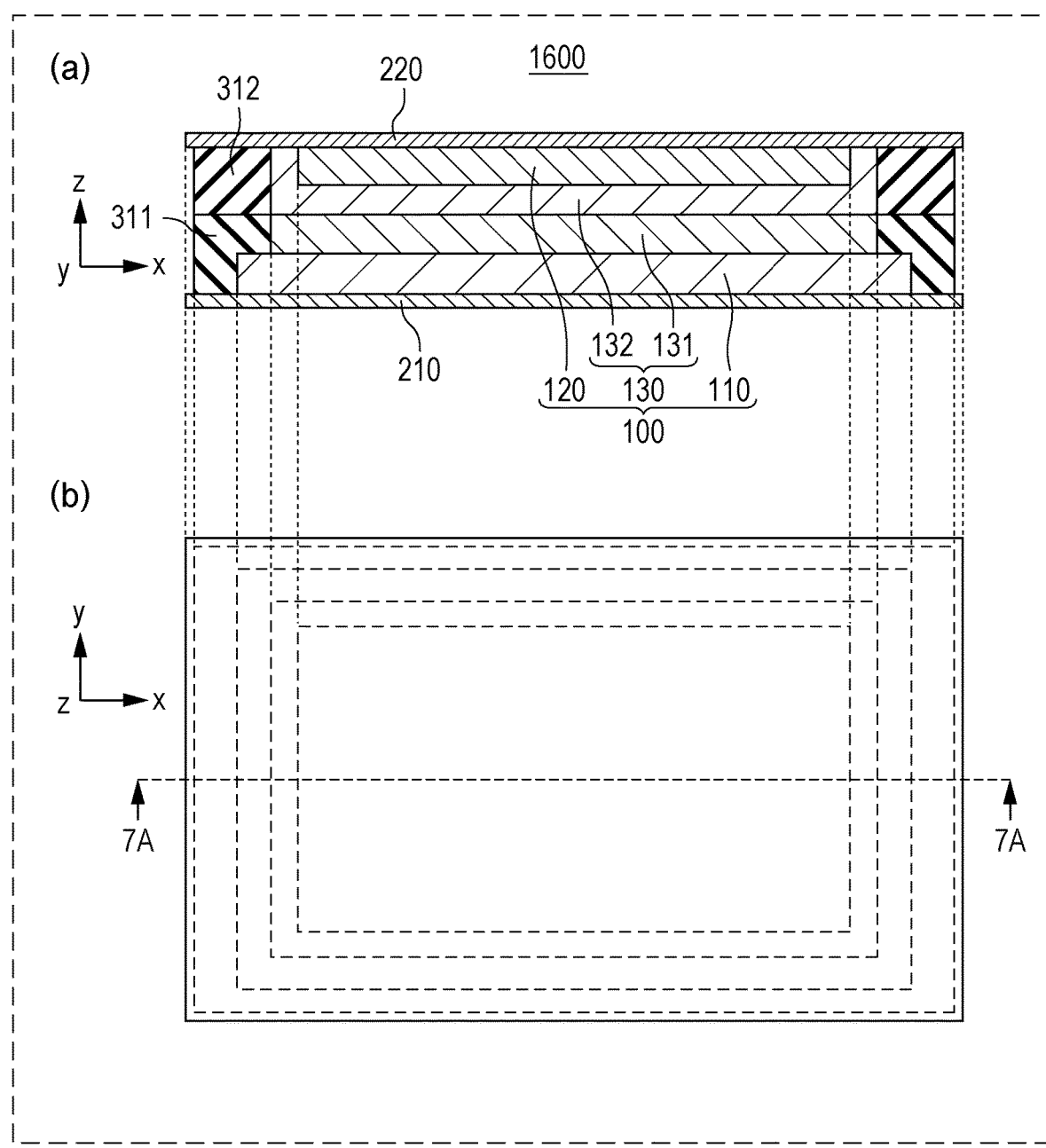
FIG. 7 shows illustrations of an example of a schematic structure of a battery in modification 6 of embodiment 1.

Modification 6 of embodiment 1 will be described using FIG. 7. FIG. 7 shows illustration of a schematic structure of a battery 1600 in modification 6 of embodiment 1. Specifically, FIG. 7(a) is a cross-sectional view showing the schematic structure of the battery 1600 and shows a cross section taken along line 7A-7A in FIG. 7(b). FIG. 7(b) is a transparent top view showing the schematic structure of the battery 1600. In FIG. 7(b), the shapes of components of the battery 1600 in plan view when the battery 1600 is viewed from above are represented by solid or broken lines.

As shown in FIG. 7, the battery 1600 includes a first sealing member 311 and a second sealing member 312 instead of the sealing member 310. The first sealing member 311 is located on a side close to the negative electrode current collector 210 and contains the first material. The second sealing member 312 is located on a side closer to the positive electrode current collector 220 than the first sealing member 311 and contains a second material. The second material differs from the first material. The second material is, for example, an insulating material having no ionic conductivity. The second material may contain a resin or a sealing material. The second material may be, for example, a material selected from the plurality of materials usable as the first material and different from the material(s) contained in the first sealing member 311. For example, the second material may be a material that is selected from epoxy resins, acrylic resins, polyimide resins, and silsesquioxanes each having thermosetting or photocurable properties and is not contained in the first sealing member 311. The second material may contain a particulate metal oxide material.

With the structure including the first sealing member 311 and the second sealing member 312, materials most optimal for the sealing members on the positive and negative electrode sides can be selected in terms of reactivity and mechanical properties. The reliability of the battery 1600 can thereby be further improved.

[Method for Producing Battery]

Next, a description will be given of an example of a method for producing the batteries in embodiment 1 and the modifications. Specifically, a method for producing the battery 1300 in modification 3 will be described using FIG. 9. This method can also be applied to the batteries 1000, 1100, 1200, 1400, 1500, and 1600.

Figure 9:
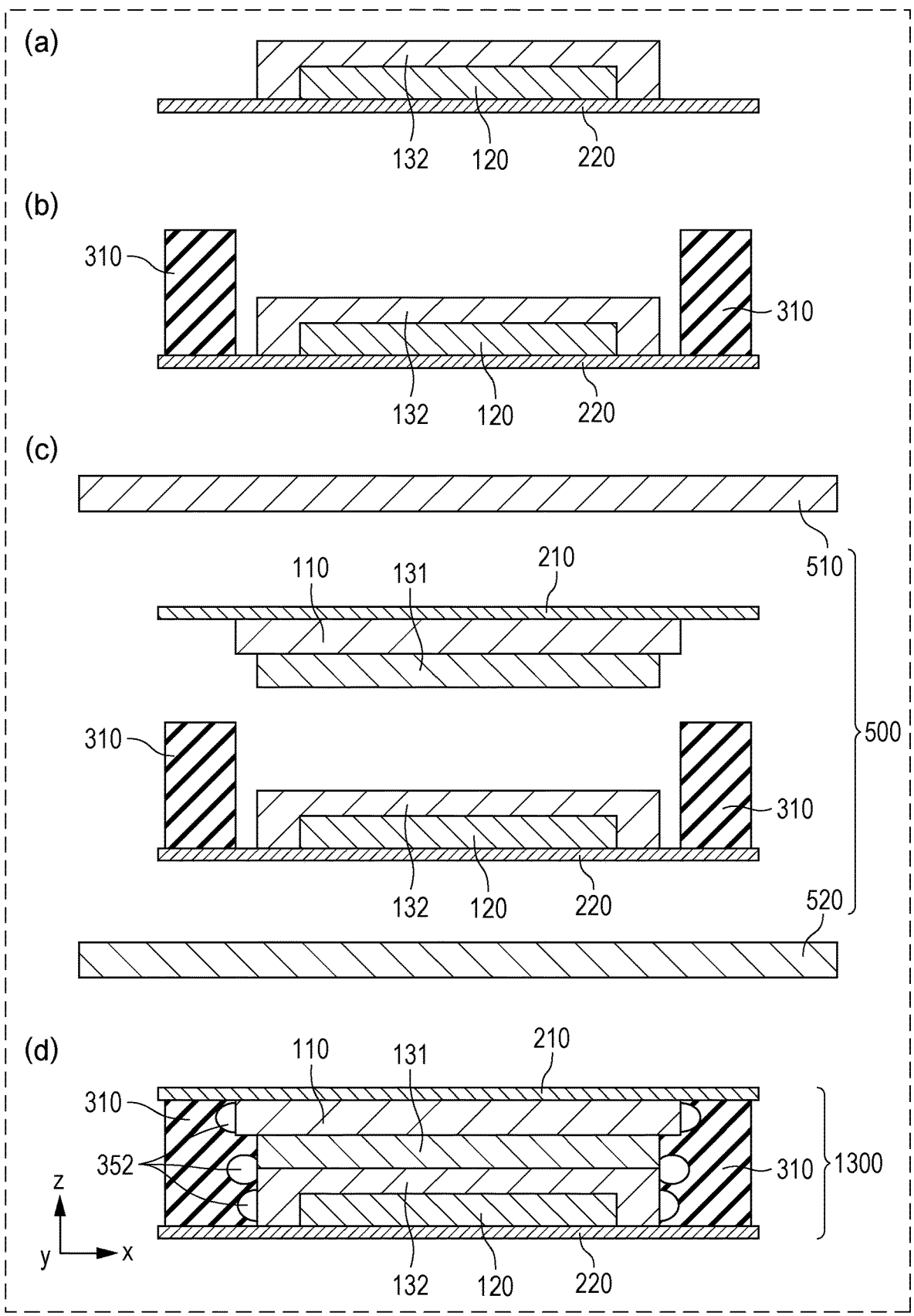
FIG. 9 shows illustrations of an example of a battery forming process in embodiment 1.

FIG. 9 shows cross-sectional views of an example of the method for producing the battery 1300.

First, a positive electrode material and a solvent are kneaded to prepare a paste-like coating material. This coating material is applied to the positive electrode current collector 220. Specifically, the positive electrode active material layer 120 is formed. Then a solid electrolyte material and a solvent are kneaded to prepare a paste-like coating material, and the coating material is applied to the positive electrode current collector 220 so as to cover the entire applied positive electrode active material layer 120 and then dried. Specifically, the positive electrode-side solid electrolyte layer 132 is formed. In this manner, the positive electrode plate shown in FIG. 9(*a*) is produced. The positive electrode material and the solid electrolyte material may be prepared as materials containing no solvent.

Next, as shown in FIG. 9(*b*), the encapsulating material is applied to the periphery of the positive electrode-side solid electrolyte layer 132. Specifically, the sealing member 310 is formed. By appropriately adjusting the thickness of the sealing member 310 in consideration of the thickness of the positive electrode active material layer 120, the thickness of the positive electrode-side solid electrolyte layer 132, the thickness of the negative electrode active material layer 110, and the thickness of the negative electrode-side solid electrolyte layer 131, the degree of spread of the encapsulating material during the formation of the battery can be controlled. By adjusting the thickness of the formed sealing member 310, the sealing member 310 in the completed battery can be such that a part of the sealing member 310 forms a protruding portion protruding inward into the solid electrolyte layer 130 or outward from the battery. The method of forming the solid electrolyte layer 130 or the protruding portion of the solid electrolyte layer 130 is not limited to the above method.

By providing a small space between the formation position of the sealing member 310 and the positive electrode-side solid electrolyte layer 132, the fine voids 352 can be formed between the sealing member 310 and the power generation element 100 after joining.

After the application of the encapsulating material, heat treatment or UV irradiation may be performed. When the encapsulating material contains a thermosetting material or a photocurable material, the viscosity of the coating material can be increased to cure the coating material while the flowability of the coating material is maintained. By increasing the viscosity and curing the coating material in the manner described above, the deformation of the sealing member 310 can be controlled.

Next, a negative electrode material and a solvent are kneaded to prepare a past-like coating material. This coating material is applied to the negative electrode current collector 210 in an area larger than the positive electrode-side solid electrolyte layer 132. Specifically, the negative electrode active material layer 110 is formed. Then the solid electrolyte material is applied to the negative electrode active material layer 110 such that the applied area is smaller than the applied negative electrode active material layer 110, e.g., is equal to the area of the positive electrode-side solid electrolyte layer 132, and is dried. Specifically, the negative electrode-side solid electrolyte layer 131 is formed. The negative electrode plate is thereby produced. The negative electrode material may also be prepared as a material containing no solvent.

Next, as shown in FIG. 9(*c*), a pressurizing jig 500 including an upper jig 510 and a lower jig 520 is used to press-bond the negative electrode plate to the positive electrode plate with the positive electrode-side solid electrolyte layer 132 aligned with the negative electrode-side solid electrolyte layer 131. Specifically, the negative electrode plate and the positive electrode plate held between the upper jig 510 and the lower jig 520 are press-bonded.

For example, a foaming source that generates a gas when heated may be mixed into the sealing member, and the pressurizing jig may be pre-heated. In this manner, a large number of fine cavities 354 can be produced in the sealing member 310 after joining.

The battery 1300 shown in FIG. 9(*d*) is thereby produced.

For example, when the encapsulating material contains a thermosetting material or a photocurable material, the sealing member 310 may be subjected to final curing using heat treatment, UV irradiation, etc. In this case, a more firmly encapsulated state can be obtained.

Instead of applying the encapsulating material to the positive electrode current collector 220, the encapsulating material may be applied to the negative electrode current collector 210 and the negative electrode active material layer 110.

The encapsulating material may be applied to the negative electrode current collector 210 and the negative electrode active material layer 110 and also to the positive electrode current collector 220. Specifically, part of the sealing member 310 may be formed on each of the negative electrode plate and the positive electrode plate, and then the negative electrode plate and the positive electrode plate may be laminated together. In this case, the amount of the sealing member 310 formed at one time is reduced, so that the sealing member 310 can be formed faster. Moreover, since the joint between the negative electrode plate and the sealing member 310 and the joint between the positive electrode plate and the sealing member 310 are formed in a reliable manner, the negative electrode plate and the positive electrode plate can be joined together through the sealing member 310 more firmly. Moreover, since the height of protruding portions of the sealing member 310 is small, the negative electrode plate or the positive electrode plate can be easily wound in the course of the process. When the first material and the second material are used for the negative electrode plate and the positive electrode plate, respectively, different encapsulating materials optimal for the negative and positive electrode plates can be selected.

The negative and positive electrode plates are press-bonded together through the above steps, and the negative electrode current collector and the positive electrode current collector are thereby firmly bonded through the sealing member 310 while a short circuit between the negative electrode current collector and the positive electrode current collector is prevented. When a material having characteristics such as shock resistance and insulating properties superior to the solid electrolyte material is used as the first material contained in the sealing member 310, the shock resistance of the battery when a shock is applied thereto can be improved.

As described above, the method for producing the battery 1300 shown in FIG. 9 includes the step of, before the positive electrode plate and the negative electrode plate are laminated together, forming the sealing member 310. In this manner, the sealing member 310 can be disposed between the negative electrode current collector 210 and the positive electrode current collector 220, and the risk of a short circuit due to direct contact between the negative electrode current collector 210 and the positive electrode current collector 220 can be significantly reduced without increasing the thickness of the battery 1300. At the same time, the bonding strength between the positive and negative electrode plates near the outer circumference of the power generation element 100 can be increased. Moreover, since the sealing member 310 is formed also on the negative electrode active material layer 110, the negative electrode active material layer 110 is more firmly held by the sealing member 310, and delamination of the solid electrolyte layer 130 when the negative electrode active material layer 110 is expanded or contracted during charging or discharging can be prevented.

The position at which the sealing member 310 is formed, the shapes of the negative electrode active material layer 110, the positive electrode active material layer 120, and the solid electrolyte layer 130, the sizes of the negative electrode current collector 210 and the positive electrode current collector 220, etc. may be adjusted. In the manner described above, the batteries shown in embodiment 1 and the modifications can be produced. By stacking a plurality of the batteries, laminated batteries shown in embodiment 2 described below can be produced.

Embodiment 2

Embodiment 2 will next be described. In the following description, differences from embodiment 1 and the modifications will be mainly described, and the description of common features will be omitted or simplified.

Figure 10:
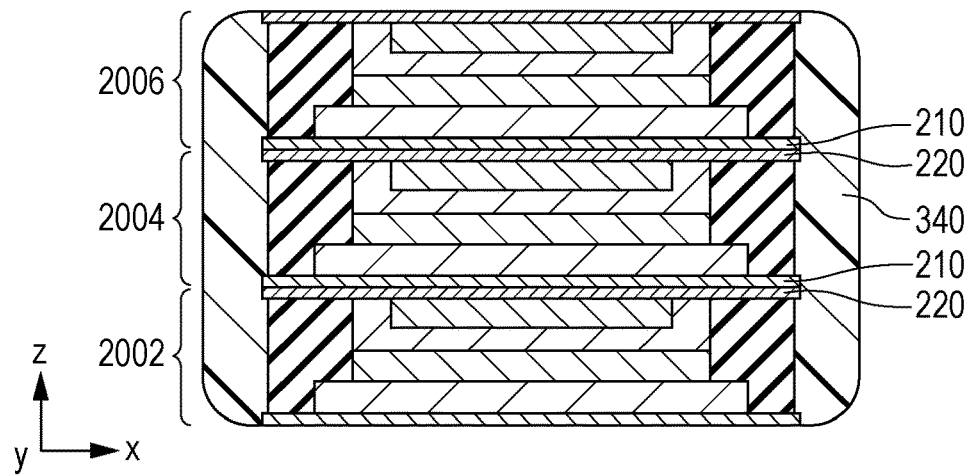
FIG. 10 is an illustration showing an example of a schematic structure of a laminated battery in embodiment 2.

FIG. 10 is a cross-sectional view showing a schematic structure of a laminated battery 2000 in embodiment 2. The laminated battery 2000 in embodiment 2 is obtained by stacking a plurality of the batteries 1000 in embodiment 1 and electrically connecting the batteries 1000 to each other.

In the example shown in FIG. 10, the laminated battery 2000 has a structure including three batteries 2002, 2004, and 2006 stacked in this order. For example, the batteries 2002, 2004, and 2006 each have the same structure as the structure of the battery 1000 in embodiment 1. For example, at least one of the batteries 2002, 2004, and 2006 may be the battery 1000 in embodiment 1 or may be at least one of the batteries 1100 to 1600 in modifications 1 to 6 of embodiment 1.

In the laminated battery 2000, the negative electrode current collector 210 of a given battery (for example, a single battery) is joined to the positive electrode current collector 220 of another battery (for example, another single battery), and the plurality of battery can thereby be stacked in series. Specifically, as shown in FIG. 10, the vertical orientations of the positive and negative electrodes of the batteries 2002, 2004, and 2006 are the same. The positive electrode current collector 220 of the battery 2002 is joined to the negative electrode current collector 210 of the battery 2004, and the positive electrode current collector 220 of the battery 2004 is joined to the negative electrode current collector 210 of the battery 2006, so that the batteries 2002, 2004, and 2006 are connected in series. The negative electrode current collectors 210 and the respective positive electrode current collectors 220 may be joined directly or may be joined using a conductive adhesive or by welding. A negative electrode current collector 210 and a positive electrode current collector 220 integrated in advance may be used. An external encapsulating material 340 is formed on the outer circumference of the laminated battery 2000. The entire laminated battery 2000 is thereby encapsulated, and the reliability of the laminated battery can be further improved.

The number of batteries included in the laminated battery may be three or more and may be only two. By adjusting the number of stacked batteries, desired battery characteristics can be obtained.

Figure 11:
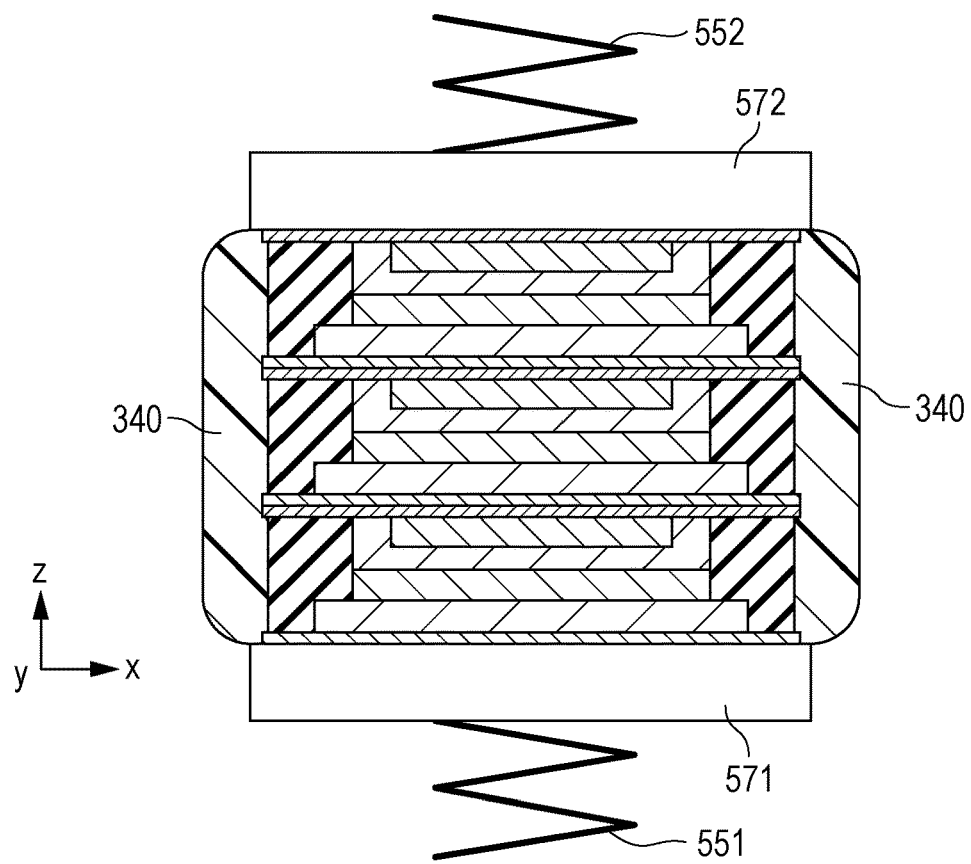
FIG. 11 is an illustration showing another example of the schematic structure of the laminated battery in embodiment 2.

As shown in FIG. 11, a laminated battery 2100 can be charged or discharged through a negative electrode current collector plate 571 and a positive electrode current collector plate 572 while the laminated battery 2100 is restrained and pressed from both side using a restraining-pressing upper jig 552 and a restraining-pressing lower jig 551.

Figure 12:
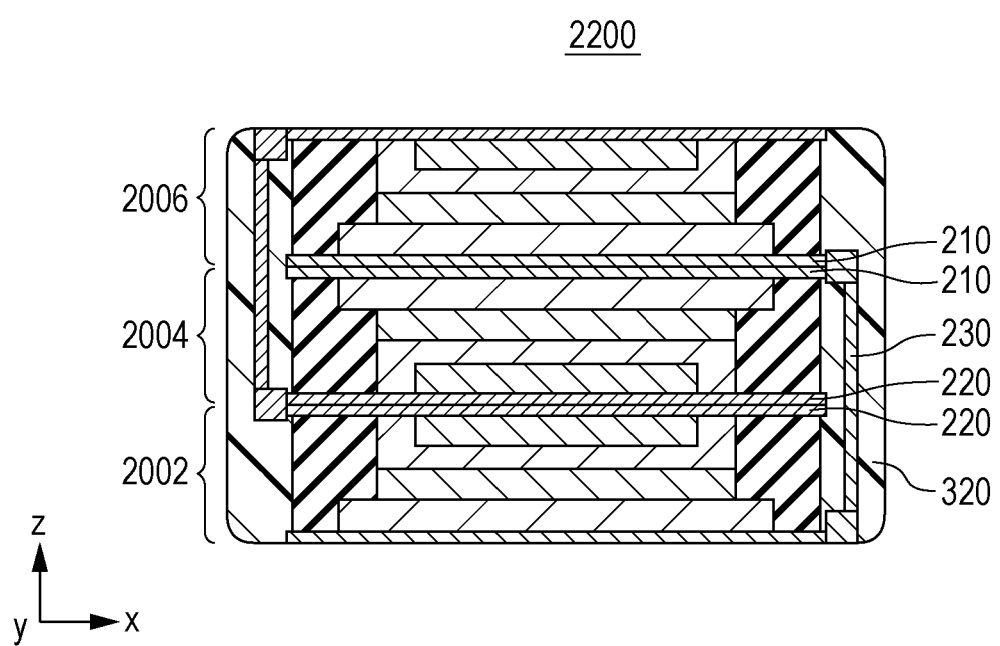
FIG. 12 is an illustration showing another example of the schematic structure of the laminated battery in embodiment 2.

When a laminated battery is formed, a plurality of batteries may be connected in parallel according to the necessary characteristics, as in a laminated battery 2200 shown in FIG. 12. In FIG. 12, the laminating direction of the battery 2004 is opposite to that in FIG. 10, and the positive electrode current collector 220 of the battery 2002 is joined to the positive electrode current collector 220 of the battery 2004. The negative electrode current collector 210 of the battery 2004 is joined to the negative electrode current collector 210 of the battery 2006. The plurality of positive electrode current collectors and the plurality of negative electrode current collectors are connected through respective parallel current collectors 230.

Batteries included in a laminated battery may be a mixture of two or more batteries connected in parallel and two or more batteries connected in series. In this case, the laminated battery can have a high capacity even though it has a limited volume. The series connection, the parallel connection, or a combination thereof can be easily obtained by changing the method of connecting the current collectors of the plurality of single batteries using a well-known technique.

With the above structure, a high voltage can be obtained by stacking a plurality of single batteries in series. Therefore, a series connection-type laminated battery with reduced risk of a short circuit can be obtained. Specifically, a laminated battery having a series-connected bipolar structure with reduced risk of a short circuit due to contact between current collectors can be formed. By connecting a plurality of single batteries in parallel, a high-capacity laminated battery can be obtained. Therefore, a parallel-connected laminated battery with reduced risk of a short circuit can be obtained. Specifically, a laminated battery having a parallel-connected stacking structure with reduced risk of a short circuit due to contact between current collectors can be formed.

The laminated battery may be sealed in a sealing case. The sealing case used may be, for example, a lamination bag, a metal can, a resin case, etc. By using the sealing case, deterioration of the power generation element due to moisture can be prevented.

(Other Embodiments)

One or a plurality of modes of the battery have been described based on the embodiments. However, the present disclosure is not limited to these embodiments. Various modifications to the embodiments that are conceivable by a person of skill in the art and modes obtained by combining components in difference embodiments are also included in the scope of the present disclosure, so long as they do not depart from the spirit of the present disclosure.

Various modifications, replacements, additions, omissions, etc. may be made to the above embodiments within the scope of the claims or equivalents thereof.

For example, in the above embodiments, the positive electrode-side solid electrolyte layer and the negative electrode-side solid electrolyte layer have the same area in plan view and are formed in the same position, but this is not a limitation. One of the positive electrode-side solid electrolyte layer and the negative electrode-side solid electrolyte layer may have a larger area in plan view, and the sealing member may be formed on a surface on which these solid electrolyte layers are not in contact with each other.

In the above embodiments, the entire stacking surface of the positive electrode current collector and its entire side surfaces are covered with the solid electrolyte layer, but this is not a limitation. The positive electrode current collector may have a shape in which only the stacking surface is covered, and the side surfaces may be in contact with the sealing member.

The battery of the present disclosure can be used as batteries for electronic devices, electric devices, electric vehicles, etc.

What is claimed is:

1. A battery comprising:
   a positive electrode current collector;
   a positive electrode active material layer disposed in contact with the positive electrode current collector;
   a solid electrolyte layer covering a stacking surface and a side surface of the positive electrode active material layer;
   a negative electrode active material layer disposed in contact with the solid electrolyte layer;
   a negative electrode current collector disposed in contact with the negative electrode active material layer; and
   a sealing member, wherein:
   a side surface of the negative electrode active material is not covered by the solid electrolyte layer and is in contact with the sealing member,
   in plan view, an area of the negative electrode active material layer is larger than an area of the solid electrolyte layer,
   in plan view, each of an area of the positive electrode current collector and an area of the negative electrode current collector is larger than the area of the negative electrode active material layer,
   in plan view, the sealing member is located outside the solid electrolyte layer,
   in cross-sectional view perpendicular to a laminating direction, the sealing member is disposed in a region sandwiched between a part of the positive electrode current collector and a part of the negative electrode active material layer in the laminating direction and a region sandwiched between another part of the positive electrode current collector and a part of the negative electrode current collector in the laminating direction,
   the solid electrolyte layer includes:
     a first solid electrolyte layer located on the negative electrode active material layer side; and
     a second solid electrolyte layer located on the positive electrode active material layer side, and
   the sealing member has a shape protruding between the first solid electrolyte layer and the second solid electrolyte layer.

2. The battery according to claim 1, wherein
the sealing member is disposed in contact with the positive electrode current collector, the negative electrode active material layer, and the negative electrode current collector.

3. The battery according to claim 1, wherein
the sealing member is in contact with a part of a stacking surface of the negative electrode active material layer.

4. The battery according to claim 1, wherein,
in plan view, the sealing member has a shape protruding outward beyond at least one of the positive electrode current collector or the negative electrode current collector.

5. The battery according to claim 1, wherein
the battery has a space inside the sealing member or between the sealing member and at least one of the positive electrode active material layer, the solid electrolyte layer, or the negative electrode active material layer.

6. The battery according to claim 1, wherein
the sealing member includes:
  a first sealing member located on the negative electrode current collector side and containing a first material; and
  a second sealing member located on the positive electrode current collector side and containing a second material different from the first material.

7. The battery according to claim 1, wherein
the sealing member contains an insulating material having no ionic conductivity.

8. The battery according to claim 1, wherein
the sealing member contains a resin or a sealing material.

9. The battery according to claim 1, wherein
the sealing member contains at least one selected from the group consisting of epoxy resins, acrylic resins, polyimide resins, and silsesquioxanes.

10. The battery according to claim 1, wherein
the sealing member contains a particulate metal oxide material.

* * * * *